July 6, 1926.  
J. T. DELANEY  
CHAIN TIGHTENER  
Filed Nov. 23, 1925
1,591,368
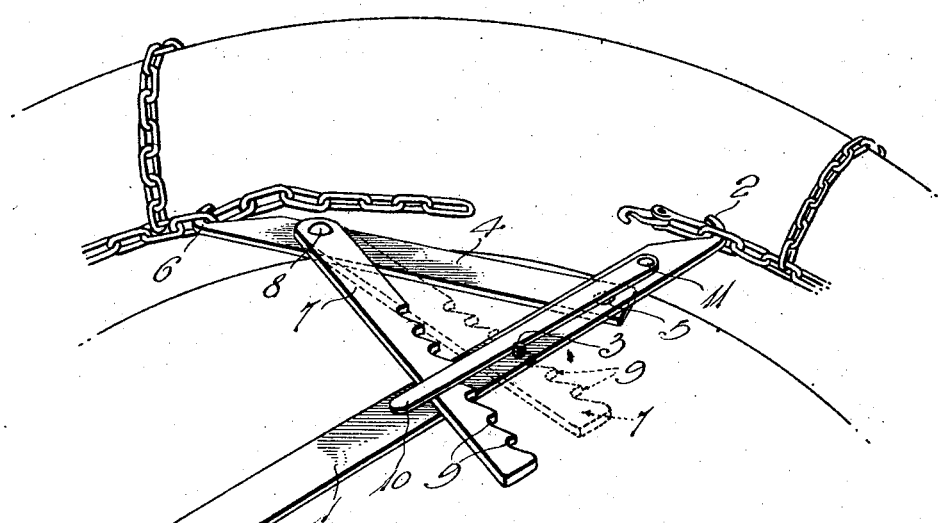
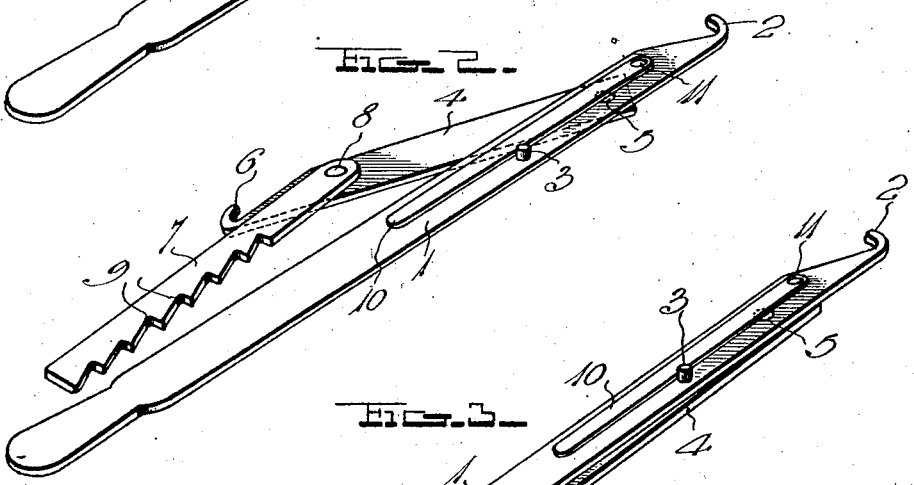
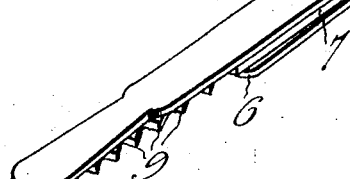
Witness  
H. Woodard
Inventor  
J. T. Delaney  
By H. B. Wilson Yeo  
Attorneys Patented July 6, 1926.

1,591,368

UNITED STATES PATENT OFFICE.

JOHN T. DELANEY, OF NODAWAY, IOWA.

CHAIN TIGHTENER.

Application filed November 23, 1925. Serial No. 70,939.

The invention relates to improvements in devices for drawing the ends of tire chains toward each other while connecting said ends with the usual fasteners, and simply by providing the device with different forms of engaging elements, it could well be used for drawing together the ends of wires, when splicing or stretching them.

It is the object of the invention to provide an exceptionally simple and inexpensive device of the character set forth, yet one which will be efficient, very desirable, easily operable, and compactly foldable.

With the foregoing in view, the invention resides in the novel subject matter hereinafter described and claimed, the description being supplemented by the accompanying drawing.

Figure 1 is a perspective view showing the application of the invention to a tire chain.

Figure 2 is a perspective view showing the tightener partly folded.

Figure 3 is a view similar to Fig. 2 but showing the device in completely folded position.

In the drawing above briefly described, the numeral 1 designates an elongated hand lever having a hook 2 or other engaging element at its front end, said lever being provided with a laterally projecting stud 3 which is spaced rearwardly from said engaging element. A lateral arm 4 has one of its ends loosely pivoted at 5 to the lever 1 at a point between the stud 3 and the engaging element 2, the free end of said arm being formed with a hook 6 or other desired type of engaging element. Loosely pivoted at one of its ends to the free end portion of the arm 5, is a link 7, the pivot of this link being designated at 8. This link extends obliquely from the arm 4 and passes across the lever 1, behind the stud 3, the front edge of said link having a plurality of spaced teeth 9, any of which may be engaged with the stud, so as to hold the lever 1 and arm 4 in fixed relation after the device has been operated, for instance to draw two ends of a tire chain together.

A spring metal strip 10 is disposed longitudinally of the lever 1 and has its front end secured to the front portion of said lever by a rivet 11 or other preferred means. This metal strip extends rearwardly across the link 7 and is under such tension as to frictionally bind said link between the spring and the lever 1, as shown in full lines in Fig. 1, the link being then swung rearwardly so that its teeth 9 are out of engagement with the stud 3. The lever 1 may now be operated in a direction to cause the engaging elements 2 and 6 to move toward each other for drawing the ends of the chain inwardly, and during this movement, the link 7 will slide between the spring 10 and the lever 1 but will be frictionally held against falling out of place, even should the untoothed edge of the link be disposed downwardly. Thus, as soon as the ends of the chain have been drawn together to the required extent, the link 7 is in readiness to be slid forwardly between the lever 1 and the spring 10, so that one of its teeth 9 will engage the stud 3, holding the device in the position to which it has been moved, while the ends of the chain or the like are being connected. Then, the link may be easily disengaged from the stud and the tool removed from the chain.

As disclosed in Figs. 2 and 3, the device is easily foldable when its use is not necessary and hence, it will require little space in a tool pocket or compartment of a machine.

Excellent results have been obtained from the details disclosed and they are therefore preferably followed. However, within the scope of the invention as claimed, changes in form, proportion and minor details, may well be made.

I claim:—

A device of the class described comprising a hand lever having an engaging element at its front end and provided with a laterally projecting stud at a point spaced rearwardly from said engaging element, a lateral arm having one of its ends pivoted to said lever at a point between said stud and said engaging element, the free end of said arm having an additional engaging element, an oblique link having one of its ends pivoted to said arm near said free end thereof, said link extending slidably across said lever behind said stud and having teeth to engage the latter, whereby to hold the lever and arm in different relative positions, and a spring metal strip secured to the front end portion of said lever, said strip extending rearwardly across said link and frictionally holding the latter against said lever.

In testimony whereof I have hereunto affixed my signature.

JOHN T. DELANEY.